Figure 1:
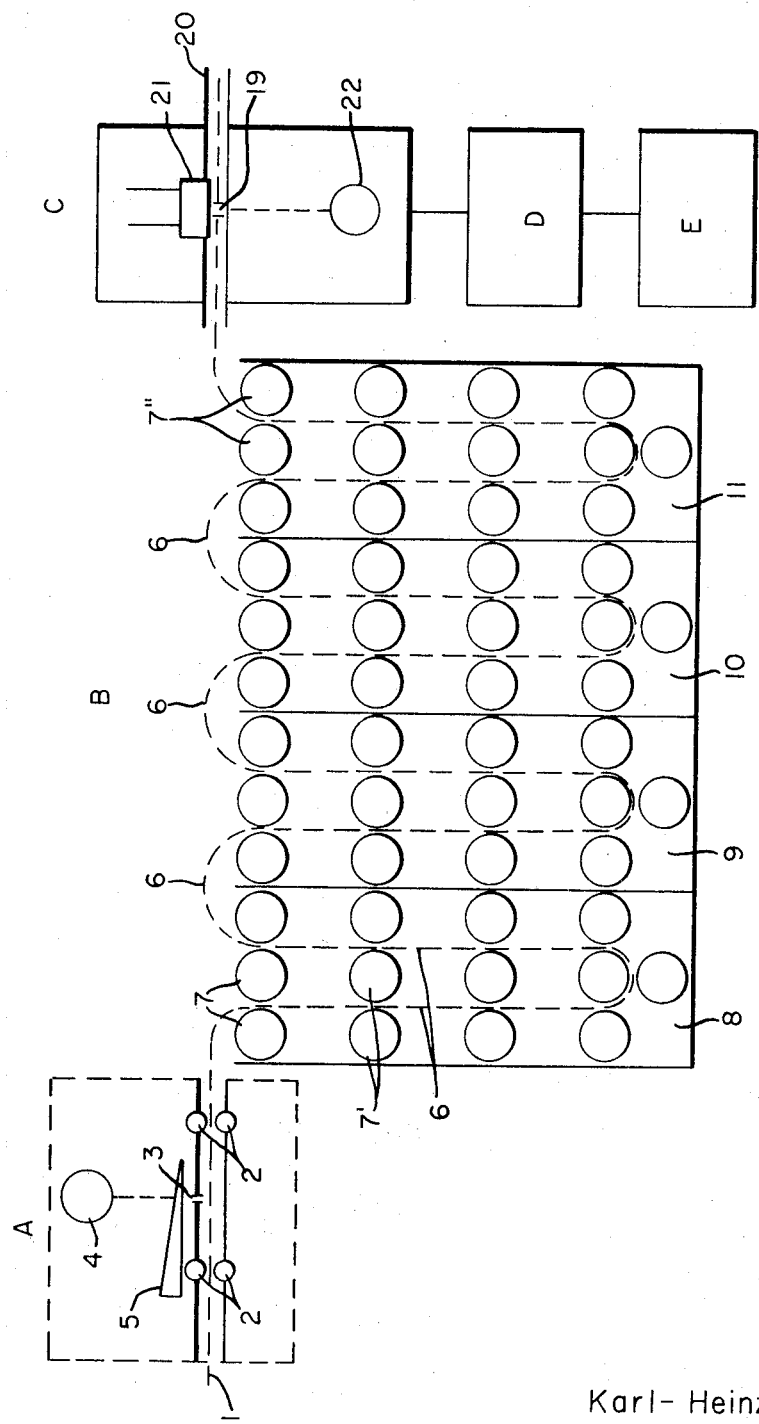

United States Patent

Fürst

[15] 3,636,851
[45] Jan. 25, 1972

[54] APPARATUS FOR AUTOMATIC FILM TESTING

[72] Inventor: Karl-Heinz Fürst, Götzenhain, Germany
[73] Assignee: E.I. du Pont de Nemours and Company, Wilmington, Del.
[22] Filed: Oct. 8, 1969
[21] Appl. No.: 864,730

[30] Foreign Application Priority Data

Nov. 7, 1968 Germany..................P 18 07 403.8

[52] U.S. Cl. ..............................95/89 R, 95/94 R, 356/202
[51] Int. Cl. ...........................................G03d 3/08
[58] Field of Search ..................95/89, 90.5, 94, 1; 356/201, 356/202, 203

[56] References Cited

UNITED STATES PATENTS

| | | | |
|---|---|---|---|
| 1,895,760 | 1/1933 | Hunt | 95/89 |
| 2,401,185 | 5/1946 | Pratt et al. | 95/94 |
| 2,762,278 | 9/1956 | Sweet | 356/202 |
| 3,090,290 | 5/1963 | Ross | 95/89 |
| 3,244,062 | 4/1966 | Sweet | 356/203 |
| 3,377,467 | 4/1968 | Staunton et al. | 356/201 X |
| 3,413,065 | 11/1968 | Funk | 356/202 |
| 3,440,935 | 4/1969 | Sanford | 95/1 |
| 3,462,221 | 8/1969 | Tajima et al. | 95/90.5 |
| 3,471,242 | 10/1969 | Nichols | 356/202 |
| 3,525,869 | 8/1970 | Gubisch | 356/201 X |

Primary Examiner—John M. Horan
Assistant Examiner—Alan Mathews
Attorney—Lynn Barratt Morris

[57] ABSTRACT

Apparatus for automatic sensitometric testing of photographic film, characterized by direct sequence of stages, synchronized one with another with respect to the feed rate of a test film strip to be passed therethrough: (a) a sensitometer in which the test film strip is passed in synchronism with a density wedge at constant speed past an exposure slit; (b) a developing and fixing bath with washing and drying sections; and (c) a densitometer, the test film strip being passed at constant speed or at a rate controlled by the densitometer itself past a photoelectric data indicator while a scanner is connected after densitometer. The device permits rapid access to sensitometric data in a few minutes.

8 Claims, 3 Drawing Figures

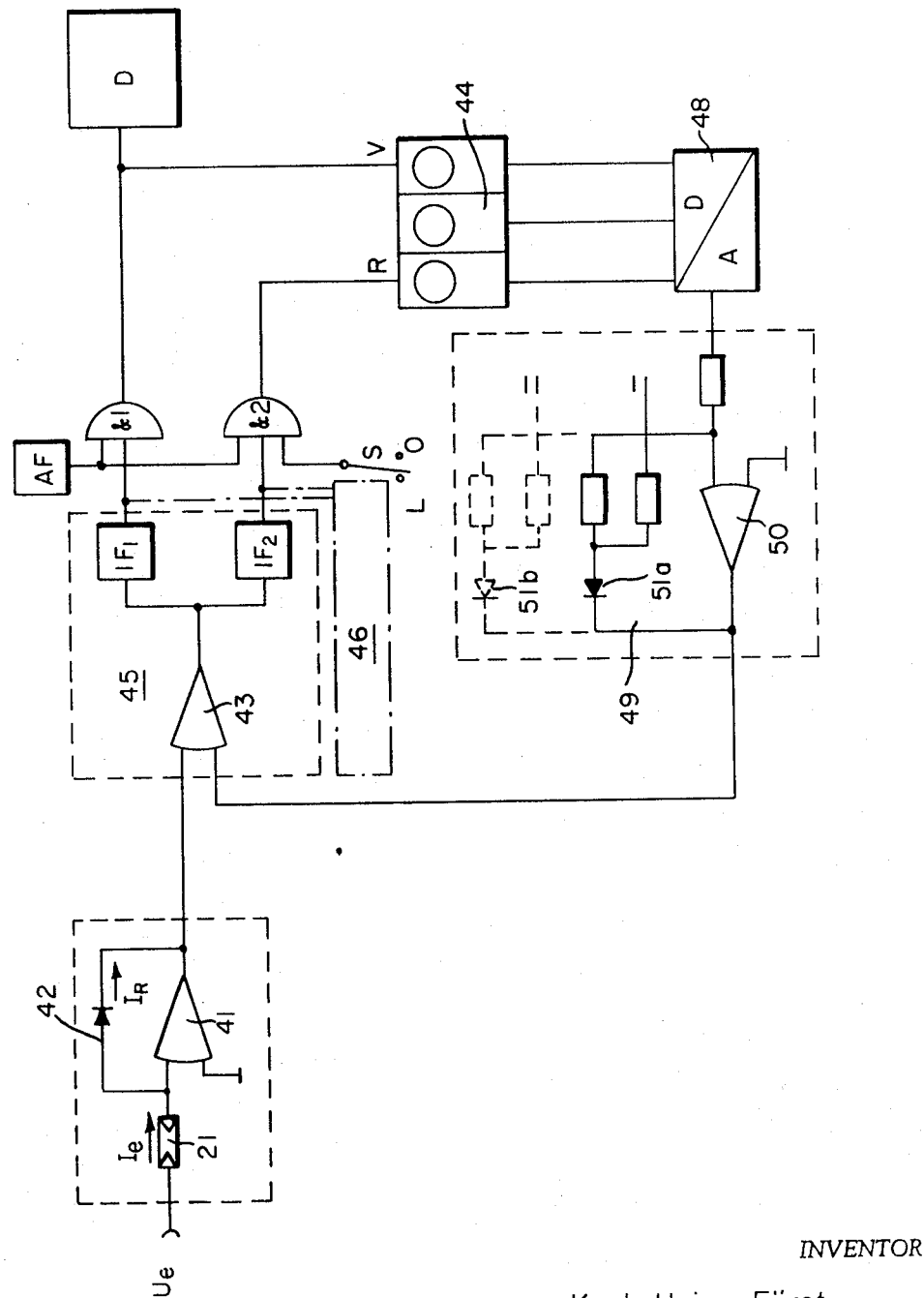

APPARATUS FOR AUTOMATIC FILM TESTING

The invention relates to an apparatus for the automatic sensitometric testing of films.

In the production of photographic film materials, up to now production control has been particularly difficult because the sensitometric testing of samples takes so much time that the results of such sensitometric testing cannot be used to guide the production operations.

Therefore, it is the object of the invention to provide an apparatus for automatic sensitometric testing with which the results of the sensitometric testing become available in a very short time, so that, if necessary, intervention in the control of production operations can be undertaken. Beyond this, as was customary previously, the apparatus also should give records of the test results on the production batch concerned that are available at any later time.

The problem posed is solved by the invention through the direct succession of the following stations, which are correlated with respect to the transport velocity of a filmstrip passed through for testing:

A. A sensitometer, in which the filmstrips to be tested are led in synchronism with a density wedge at a constant speed past an exposure slit,
B. a developing and fixing bath with washing and drying sections or units, and
C. a densitometer, in which the filmstrips to be tested are led at a constant speed past a photoelectric measurement transmitter, in doing which an evaluation apparatus is provided beyond the densitometer.

The apparatus of the invention makes it possible for all important sensitometric data to be available in a few minutes, at most 3 to 5 minutes, after introduction of the unexposed film to be tested. Through this substantial shortening of the time necessary for the sensitometric testing, it is possible to intervene in a process operation promptly.

In a preferred embodiment of the invention the densitometer is constructed as a digital densitometer with linearizing arrangements. In this way the sensitometric data determined are available immediately in digital representation, so that the evaluation of these data is simplified substantially and is possible much faster. Through the digital representation of the sensitometric data determined, there is a possibility of attaching a process computer to the digital densitometer for guiding and controlling the manufacturing operation. Then the densitometric data in digital representation are introduced in the process computer along with additional measured data to control and guide the entire manufacturing operation.

Within the scope of the invention it is especially suitable to combine the developing and fixing baths and the washing and drying sections into a composite roll-developing machine.

For filmstrips coated on both sides, it is possible within the scope of the invention, to provide a two-armed light conductor in the sensitometer for splitting the light beam and exposing both coated surfaces of the filmstrips.

Figure 2:
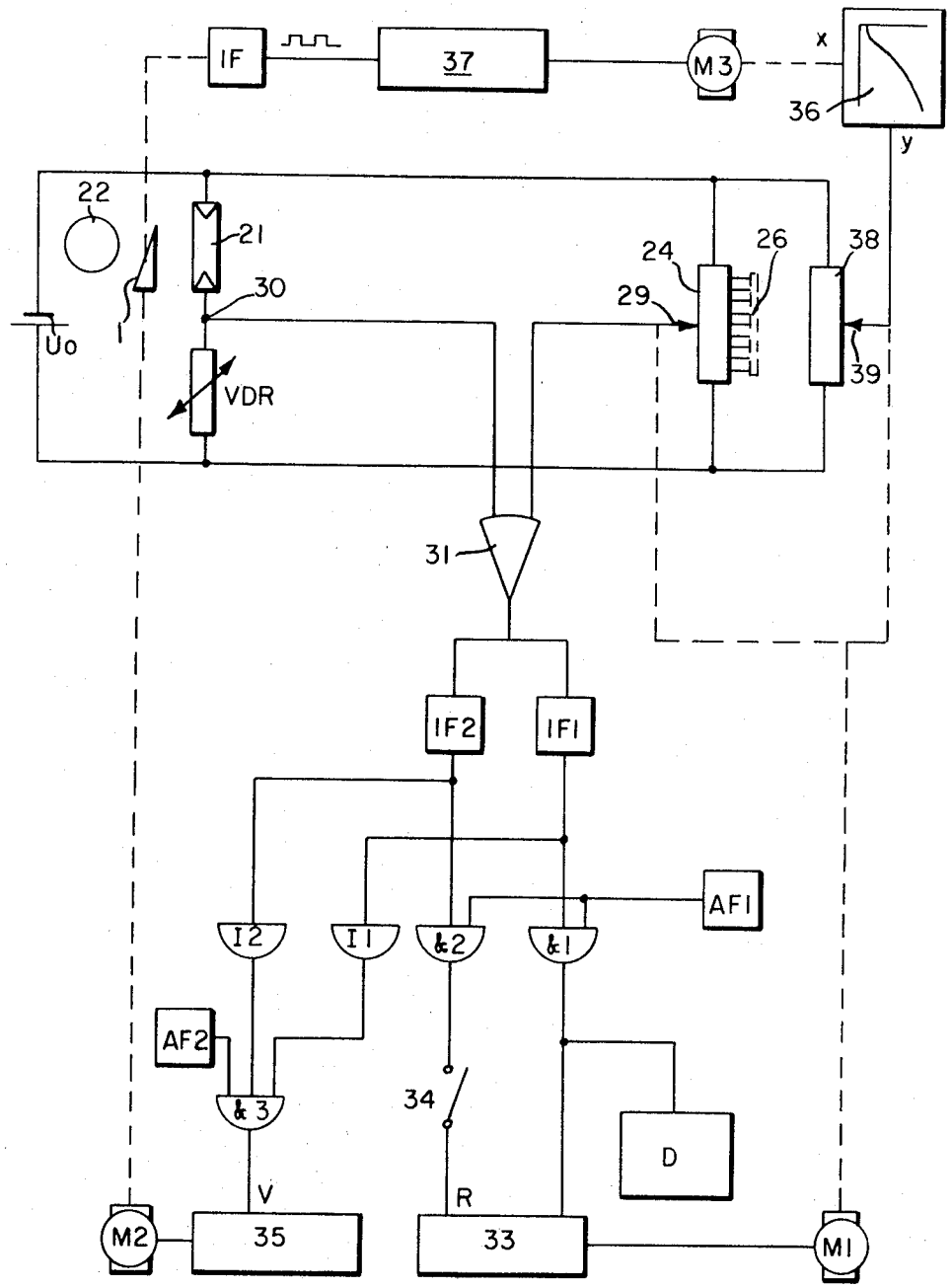

In the following, examples of embodiments of the invention are explained in detail with reference to the drawings. They include:

FIG. 1, a schematic block representation of one embodiment of the apparatus of the invention;

FIG. 2, a schematic diagram of a prospective digital densitometer within the scope of the invention and FIG. 3, a schematic diagram of a second digital densitometer that can be used within the scope of the invention.

In the example of FIG. 1, the apparatus of the invention, in essence, contains three units in direct succession, that are correlated with respect to the transport velocity of a filmstrip 1 to be passed through for testing that includes a sensitometer A, a developing-fixing-washing-drying unit B and a densitometer C.

The filmstrip 1 is introduced in the sensitometer A and there is grasped by the transport rollers 2. These transport rollers 2 lead the filmstrip 1 at a constant speed past an exposure slit 3. Through this, the exposure time of the sensitometer A is determined. Synchronous with the filmstrip 1, a density wedge 5 is used between the slit 3 and the light source or exposure lamp 4. Through this density wedge 5, the radiation intensity striking the film 1 is varied. With films coated on two sides the light beam can be split using a two-armed light conductor which is introduced behind the density wedge 5. The decisive advantage of such sensitometers A lies in the fact that only one narrow slit 3 must be exposed. Therefore, low-power lamps can be used, the lamp current of which can be stabilized simply.

When the filmstrip 1 has passed the sensitometer A it is grasped in a longitudinal guide 6, which also can extend through the sensitometer A, by the entrance rollers 7 of the developing-fixing-washing-drying unit B and pulled into it. The filmstrip, in its guideway is then passed from the pair of entrance rollers 7 to the next pair of rollers 7', etc., from roller pair to roller pair and by means of the guideway 6 is led through the developer tank 8, the fixing bath 9, the washing bath 10 and the drying chamber 11. The pair of exit rollers 7" then directs the filmstrip to the densitometer C. The velocity of the filmstrip 1 through the developing-fixing-washing-drying unit B is constant and adjusted to the transport velocity in the sensitometer A. Within the densitometer C the transport velocity of the filmstrip 1 is controlled by the densitometer C itself.

The densitometer C is a digital densitometer. It contains a measurement transmitter 21, a light source or exposure lamp 22, and a guideway 20 for the film. In guideway 20 slit 19, illuminated by light source or exposure lamp 22, is disposed opposite measurement transmitter 21; from this slit the filmstrip is exposed for determination of its density.

In the example shown, an electronic evaluating apparatus is attached to the densitometer C, in which the values for fog, sensitivity and contrast are determined from the density curve measured in the densitometer.

In the example shown a punch E for punching cards is attached to the evaluating apparatus D, which stores the values determined on punched cards.

FIG. 2 shows an embodiment of a digital densitometer that can be used within the scope of the invention. The nucleus of the device is a bridge circuit with the photoconductive cell 21, the varistor load impedance VDR, the function potentiometer 24 the parallel resistances 26 of which are indicated only by dotted lines, and the current Uo. In the example of FIG. 2, the balancing arrangement contains an operation amplifier 31 to compare the signal on tap 29 of the function potentiometer 24 with the measured signal at point 30 between the photoconductive cell 21 and the varistor load impedance VDR. Two impulse shapers IF 1 and IF 2 are connected to the operation amplifier 31. To each of the impulse shapers IF 1 and IF 2 an AND-gate &1 and &2 are connected. These AND gates carry an L-signal at their output only when all inputs carry L-signals. The two AND-gates &1 and &2 are attached with the second input to an impulse generator AF 1. The AND-gate &1 for the forward counting is attached with its output to the evaluating apparatus D and through an electronic switch 33 to step motor M 1 for the step-by-step displacement of the tap 29 of the function potentiometer 24. The function potentiometer 24 and the adjusting motor M 1 are adjusted toward one another so that each displacement step corresponds to 100th part of a density unit.

In the device represented above, the analog-digital conversion takes place quite simply. The difference voltage at the measuring bridge is amplified with the operation amplifier 31, so that the two impulse shapers IF 1 and IF 2 conduct L-signals with an unbalanced bridge and O-signals with a balanced bridge. Through this, the AND-gates &1 and &2 are prepared to let L-signals through from the impulse generator AF 1. The AND-gate &2, provided for the backward counting and the backward displacement, is switched off in such a case through a switch 34 activated automatically by the sample 1 in the guideway of the apparatus. Naturally, in this way samples 1 can be measured only from their least darkened side.

Therewith, a condition is achieved in which pinholes (nadelstichahnliche klare Stellen) and fine, light scratches in the sample do not interfere with the measuring process and the measured result. Therefore, the AND-gate &2 serves essentially, with closed switch 34, that is after removal of the sample from the apparatus, to return the function potentiometer 24 to the original position. An L-signal located at the output of the AND-gate &1 is led to the evaluation apparatus D and there is stored and indicated. Besides, this L-signal is fed through the electronic switch 33 to the motor M 1 and there is used to displace the tap 29 in the direction of greater density. If, with the one displacement step, the bridge is still not balanced and, therefore, there is still an L-signal at the impulse shaper IF 1, the next L-signal from the impulse generator AF 1 will be let through the AND-gate &1 until the bridge is balanced.

When the bridge is balanced, there is an O-signal at the output of the impulse shaper IF 1. Through this, the AND-gates &1 and &2 are closed for the L-signals of the impulse generator AF 1. Therefore, there can be no further counting in the evaluation apparatus D and no further displacement of the function potentiometer 24 can take place. In addition, through the impulse inverters I 1 and I 2, a third AND-gate &3 is attached to the impulse shapers IF 1 and IF 2 which guides the L-signals of a second impulse generator AF 2 over an electronic switch 35 to the transport step motor M 2 for the sample. In this way the AND-gate &3 has the required L-signals at all inputs only when O-signals are present at the outputs of the impulse shapers IF 1 and IF 2, that is when the bridge is balanced.

In the example of FIG. 2, in addition, a curve recorder 36 is provided, the drum of which is driven for the X-coordinate of the curves by the transport of the sample 1 through an impulse shaper IF and an electronic switch 37 as well as by a step motor M 3. The Y-values of the curves are formed by a potentiometer 38, the tap 39 of which, together with the tap 29 of the function potentiometer 24 is driven by the step motor M 1. Consequently, the above-described apparatus gives a direct digital measurement of the density and, if desired, also a continuous density curve.

In the embodiment according to FIG. 3 of an apparatus according to the invention, aside from the drive for the filmstrip there are no other mechanically moving parts. Also, the counting decades in the evaluation apparatus D should be of an electronic type. The bridge system is replaced by an electronic servosystem.

In the example of FIG. 3, a constant voltage Ue is applied to the photoconductive cell 21, so that the current Ie flowing through the photoconductive cell 21 is a function of the density to be measured. An operation amplifier 41 is connected to this photoconductive cell 21, which has a diode 42 with a logarithmic U–I curve in the feedback branch. In this way, the photoelectric cell 21, the operation amplifier 41 and the diode 42 form a logarithmic amplifier, which already largely linearizes the U–D curve. This logarithmic amplifier is applied to the input of an operation amplifier 43 (which corresponds to the operation amplifier 31 in example 2). The second input of the operation amplifier 43 is applied over a function generator 49 and a digital-analog converter 48 to the counter 44. Therefore, in the operation amplifier 43, the signal coming from the logarithmic amplifier 21, 41, 42 and a signal coming from the counter 44 are compared. If the two signals are the same, the operation amplifier 43 produces an O-signal at the output of each of the impulse shapers IF 1 and IF 2 connected on the load side of it. If the input signals on the operation amplifier 43 are not the same, L-signals are formed at the output of the impulse shapers IF 1 and IF 2. As in example 2, the L-signals appearing at the outputs of the impulse shapers IF 1 and IF 2 are led to AND-gates &1 and &2 to control the L-signals of an impulse generator AF. As in example 2, the impulse shaper IF 2 and the AND-gate &2 are thought of as being for the resetting of the apparatus. Therefore, preferably in guideway channel, a switch S provided for the sample 1 is applied to the AND-gate &2, which with the sample in place continuously gives an O-signal at the input, and with an empty guideway channel gives an L-signal. Behind the voltage comparator 45 formed by the operation amplifier 43 the two impulse shapers IF 1 and IF 2, as indicated by dotted lines, the control for the sample advance, formed as in example 2 from impulse inverters and an AND gate, can be connected. However, since the measuring procedure and the balancing in the apparatus according to FIG. 3 take place much faster than the mechanical advance of the sample, an advance control 46 in the balanced state of the apparatus is no longer absolutely necessary.

The final signal is conducted from AND-gate &1 to the evaluation apparatus D in the forward direction to the counter 44. The counter 44 again is connected to the input of a digital-analog converter 48 which delivers a voltage to the function generator 49 that is proportional to the position of the counter at the time. The function generator 49 consists essentially of an operation amplifier 50 with biased diodes 51a, 51b, etc., in the feedback branch. Through suitable calibration a condition can be reached in which a voltage curve dependent on the state of the counter results at the output of the function generator 49, that is equal to the voltage curve at the output of the logarithmic amplifier 21, 41, 42 as a function of the density ahead of the photoconductive cell 21. Consequently, the comparison signals fed to the voltage comparator 45 from the function generator 49, as in example 2, are a function of the impulse number stored in the counter as a modified function of the characteristic of the measurement transmitter.

I claim:

1. Apparatus for the automatic sensitometric testing of photographic film, characterized by the following units in direct succession, which are correlated with respect to the speed of transport of a photographic film passed through the apparatus,
   A. an exposing unit having means for guiding a film to be tested, an exposure slit adjacent said guiding means, an exposure lamp behind said slit, means to grip the film and to transport it at a constant rate of speed past the slit, a density wedge arranged to be moved parallel to said film and past said slit to vary the film exposure by varying the wedge density within a film area moved in synchronism with the wedge past the slit;
   B. a developing and fixing bath combined with washing and drying sections for the exposed film to be tested, and
   C. a densitometer having guiding means for the developed and fixed film, an exposure slit, an exposure lamp behind said slit, and a photoelectric measurement transmitter opposite to the said slit, said densitometer further having means to transport said film at a controlled rate of speed, and an evaluation device operatively connected to said photoelectric measurement transmitter to evaluate the characteristics of the film from the density curve measured in the film area that was moved simultaneously with the said density wedge past the exposure slit in the said exposing unit.

2. Apparatus according to claim 1, characterized in that the sensitometer is provided with a two-armed light conductor for splitting the light beam and exposing filmstrips with coatings on both surfaces.

3. In an apparatus according to claim 1, an evaluation device constructed to convert the output of said photoelectric measurement transmitter into a linearized digital output to form a digital densitometer having linearizing arrangements.

4. In an apparatus according to claim 1, the developing and fixing bath being combined with the washing section and the drying section to form a composite film testing and processing machine.

5. Apparatus according to claim 3, characterized in that a process computer is attached to the digital densitometer for the guidance and control of the manufacturing process.

6. Apparatus according to claim 3, characterized in that the digital densitometer contains a balancing arrangement of the type of a bridge connection with a function potentiometer.

7. Apparatus according to claim 3, characterized in that the digital densitometer contains a balancing arrangement of the type of an electronic servosystem with a function generator.

8. Apparatus according to claim 4, characterized in that the roll-developing machine, in addition to its transport rollers contains a continuous guideway for the filmstrip, which extends from the exit of the sensitometer to the entrance of the densitometer.

* * * * *